H. C. & H. B. BOURQUIN.
DEVICE FOR CASTING ORNAMENTS IN WORK OF PLASTIC MATERIAL.
APPLICATION FILED MAY 11, 1914.
1,146,397.
Patented July 13, 1915.
3 SHEETS—SHEET 1.
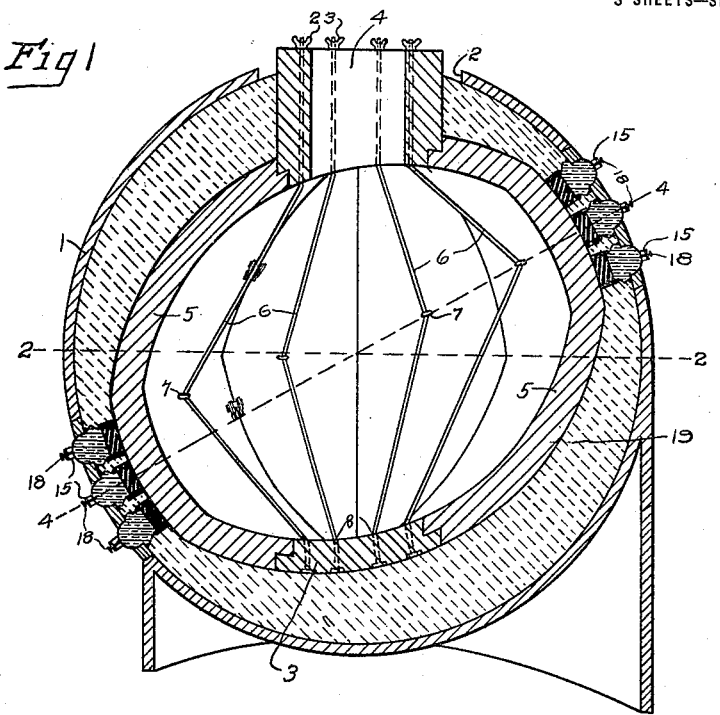
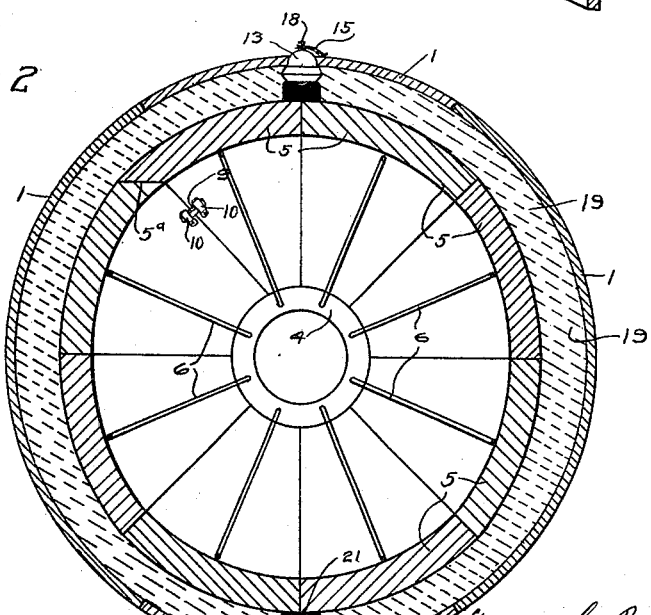

H. C. & H. B. BOURQUIN.
DEVICE FOR CASTING ORNAMENTS IN WORK OF PLASTIC MATERIAL.
APPLICATION FILED MAY 11, 1914.
1,146,397.
Patented July 13, 1915.
3 SHEETS—SHEET 2.
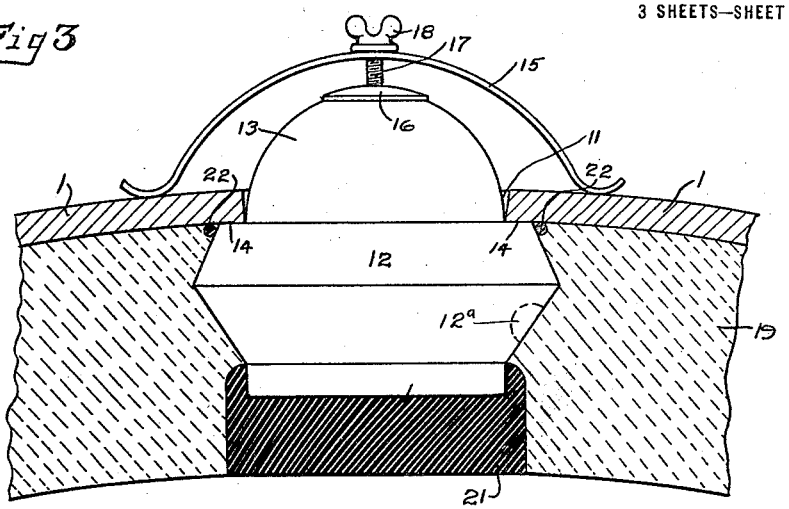
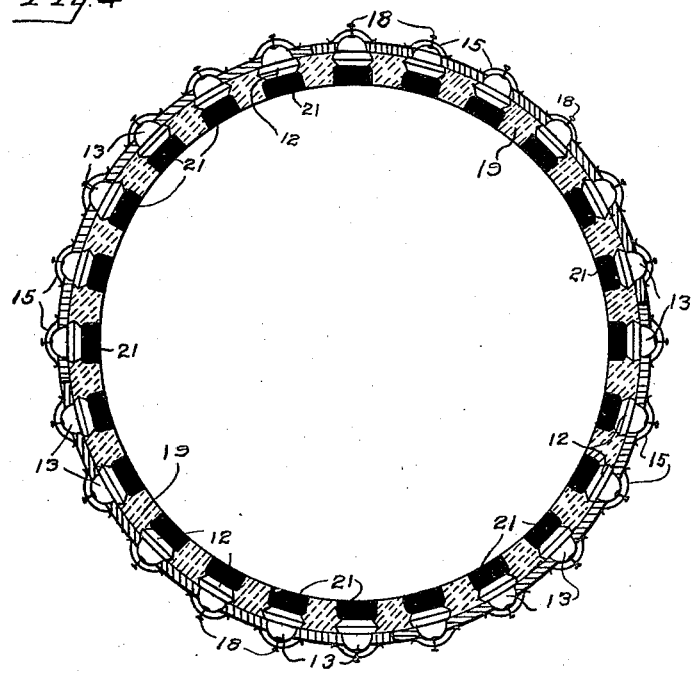

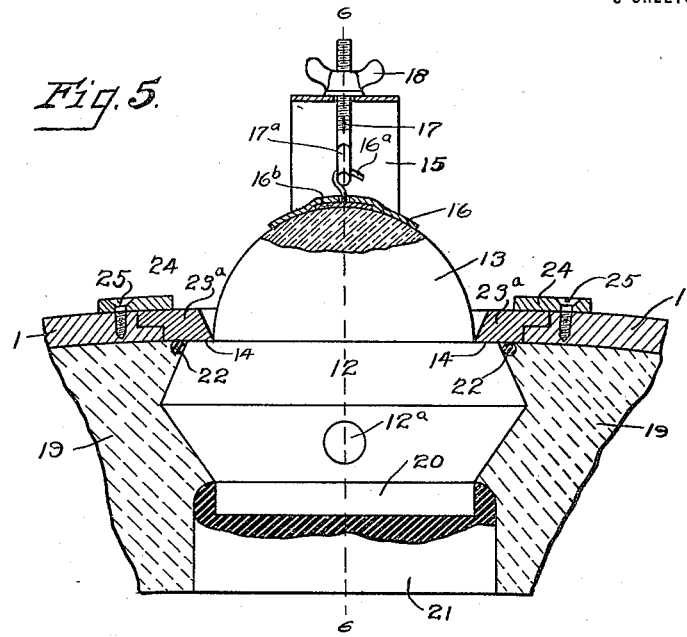
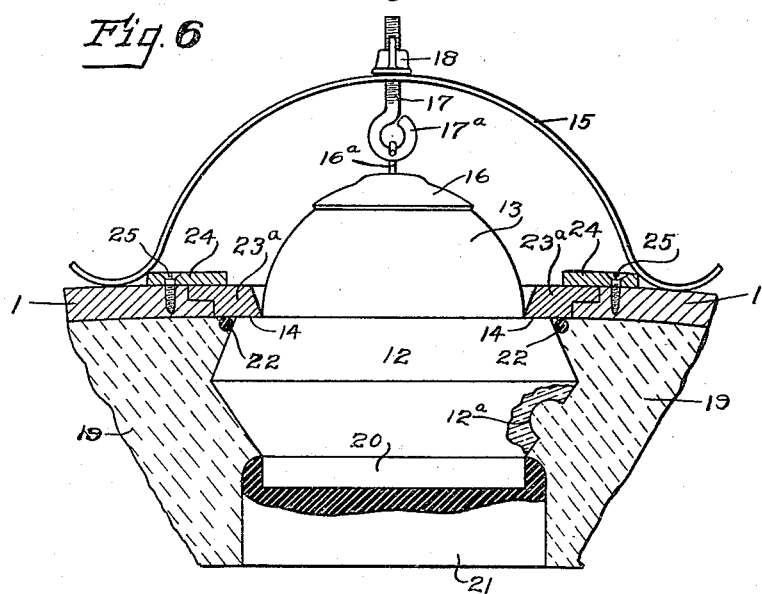

UNITED STATES PATENT OFFICE.

HENRY C. BOURQUIN, OF ST. MARYS, AND HARRY B. BOURQUIN, OF SPRINGFIELD, OHIO.

DEVICE FOR CASTING ORNAMENTS IN WORK OF PLASTIC MATERIAL.

1,146,397. Specification of Letters Patent. Patented July 13, 1915.

Application filed May 11, 1914. Serial No. 837,757.

*To all whom it may concern:*

Be it known that we, HENRY C. BOURQUIN, residing at St. Marys, in the county of Auglaize and State of Ohio, and HARRY B. BOURQUIN, residing at Springfield, in the county of Clark and State of Ohio, both citizens of the United States, have invented certain new and useful Improvements in Devices for Casting Ornaments in Work of Plastic Material, of which the following is a specification.

This invention relates to improvements in devices for casting ornaments in work of plastic material.

The object of the invention is to provide for relieving the plain appearance of plastic material, such as structures of different kinds formed from cement, by introducing therein ornaments or embellishments in the nature of glass, porcelain, or other material of that kind, which will be cast into the plastic material in a manner to be partially exposed on the outer surface thereof.

A further object of the invention is to further carry out the foregoing idea by introducing into the walls of hollow plastic material work ornaments which will be transparent in their nature, such as colored glass, in a manner to be exposed on the exterior of the structure and to also communicate with the interior thereof so that by illuminating the interior of the structure, a pleasing effect will be presented to the exterior; the more particular object being to provide embellishments or ornaments of colored transparent material formed in different designs in the plastic material structure.

A further object of the invention is to provide simple and effective devices for molding structures formed of plastic material and providing the same with ornamentations of a different material to give to the plastic material a pleasing effect.

The invention consists in the constructions and combinations of parts hereinafter described and set forth in the claims.

In the accompanying drawings, Figure 1 is a vertical sectional view of a mold and its core with the casting of plastic material and its ornaments shown therein. Fig. 2 is a section on the line 2—2 of Fig. 1. Fig. 3 is a detail sectional view of a portion of the mold, the casting and one of the ornaments. Fig. 4 is a section on the line 4—4 of Fig. 1. Fig. 5 is a detail sectional view of a portion of the mold, the casting and one of the ornaments, showing a removable bushing. Fig. 6 is a section on the line 6—6 of Fig. 5.

Like parts are represented by similar characters of reference in the several views.

In the particular construction shown in the drawings, there is illustrated a mold for casting hollow spheres of plastic material and for also casting therein ornamentations in the nature of a series of jewels formed from colored glass, which will extend about the periphery of the finished product. It will be understood, however, that that is but one form of the invention, as castings of plastic material in other forms, both solid and hollow, may be constructed in accordance with our invention.

In the said drawings, 1 represents the walls of the mold proper which are formed in sections held together during the molding operation by suitable well known locking devices (not shown), a circular opening 2 being left at one point for the purpose of pouring the cement. In the present case we have shown the core made up of a series of sections, in the present case ten sections being employed. The exact shape and size of these sections is immaterial, it being sufficient to say that the sections will be made small enough to be removed through the opening 2 after the plastic material has set and will be of such form as to provide for different thicknesses in the wall of the plastic material structure. For instance, it is desirable that the walls at that point where the ornaments are placed shall be of the least thickness, so as to permit the jewels to communicate with the interior of the structure, while the balance of the walls of the plastic material structure should be of sufficient thickness to give the required strength.

In the present case the core is shown constructed in ten sections, two sections 3 and 4 arranged diametrically opposite each other and eight segment-shaped sections 5 extending in curved lines from the respective sections 3 and 4. Each of the sections 5 has a shouldered engagement with the respective sections 3 and 4. After the sections are assembled they will be held in position by wires 6 which extend through perforations in the section 4 and eyelets 7 on the interior of the respective sections 5 and are connected as at 8 to the section 3. By drawing these wires taut and securing them, it will be seen that all of the sections will be held securely together. One of the sections 5 has both of its sides formed parallel to permit it to be removed in this assembling of the core. For instance, it will be seen that the side 5ª of one of the sections is parallel with the opposite side of said section, the side of the adjacent section being shaped to conform thereto, so that this particular section with the parallel sides may be readily removed so soon as the section 4 is taken out, thus giving room for the separation of the balance of the sections 5. To prevent the section with the parallel sides from pulling out when its wire is tightened, suitable fastening devices are provided between it and the adjacent section, these fastening devices being in the nature of bars 9 which pass through keepers 10 on the respective sections, these bars being removed by inserting the hand through the opening left by the section 4. Another form of section core can be constructed of material which can be readily crumbled, such as a mixture of sand and wheat flour.

The walls 1 of the mold will be formed with a series of openings to receive the ornaments during the molding operation, and these openings will be of such relation to each other as to give the proper effect and design desired. For instance, in the present case, there is shown three series of openings extending completely around the mold and the ornaments will be held in these openings during the molding operation in the following manner, reference being had more particularly to Fig. 3 for detail. 11 represents an opening in the wall 1 and 12 represents the main body of the ornament, a reduced rounded portion 13 of which projects through the opening, the shoulder 14 formed by the main body and the reduced portion being held against the inside of the walls 1 in the following manner: 15 represents a bridge which may be in the nature of a flat spring. The portion 13 of the ornament has secured thereto, preferably by gluing, a piece of fabric 16 to which fabric is removably secured a screw-threaded pin 17 which extends through the center of the bridge 15 and receives a thumb nut 18 so that by screwing the thumb nut 18 down upon the bridge, the ornament will be drawn against the interior of the walls 1 and held in this position. The pin 17 is secured to the fabric by providing the end of the pin with an eye 17ª to receive a hook 16ª which projects from a concave plate 16ᵇ placed between the ornament and fabric. The main body 12 of the ornament has its sides beveled outwardly so that after the cement, which is represented by 19, is poured about the same, the ornament will be firmly embedded therein and prevented from slipping in either direction from the finished casting. The lower end of the ornament has a reduced portion 20 which receives a soft rubber cap 21 which serves the purpose of providing an opening in the finished casting for light penetration and also to allow for more thickness of material in the wall of the casting at this point. This cap also provides for making a good contact on the surface of the core. A ring 22 of soft rubber is also preferably placed about the main portion 12 just beneath the walls 1 to prevent displacement of water or sand through leakage caused by any imperfect contact of surface of the ornament to the inner surface of the walls of the mold. After the casting has been made and removed from the mold, these rubber caps and rings are removed. After the cement or other plastic material has become properly set in the mold, the thumb screws 23 are removed from the ends of the wires 6, which permits the section 4 to be removed, after which the section 5 and the section 3 are removed, in the manner before explained. By assembling the thumb screws 18, the bridges 15 may be removed from the pins 17 and then the pins detached from the fabric 16. The fabric 16, as before stated, being preferably glued to the jewels 13, may be readily removed therefrom by moistening and scraping. The walls 1 may be removed before or after the removal of the core, leaving the finished product ornamented with the jewels or embellishments described.

In Fig. 6 there is illustrated a slight modification in which there is shown a bushing 23ª inserted in the opening 11, the walls of the mold about the opening being shouldered to receive this bushing. The bushing is held in place by clamps 24 pivoted to the walls of the mold by screws 25. By first removing these bushings, it will be seen that the walls of the mold may have a greater altitude of movement toward the ornaments so that it will not be necessary to make the walls of the mold in as many sections as in the construction shown in Fig. 3.

Structures of plastic material may be thus constructed in many different forms and used for porches, gate entrances to drive ways, ornamental cement work for lawns, parks and the like, and in fact for any cement work to which it is desired to give an ornamental appearance. By casting the cement structure hollow and illuminating it in any desired way, a pleasing illuminated effect may be given to the structure by employing different colored jewels arranged in tasty designs. In order to prevent the ornament from turning in the casting, the main portion 12 thereof may be provided with one or more recesses 12ª, into which the plastic material will enter so as to make an interlocking joint.

Having thus described our invention, we claim:

1. In combination with a mold for plastic material having separable walls and openings therein, an ornament partly extending through each opening having a shoulder to engage the interior of the wall about said opening, and means on the exterior of said wall for holding said ornament in position.

2. The combination of a mold for plastic material having outer separable walls and a movable inner core, the outer walls of said mold having a series of openings, and means on the outside of said outer walls for holding transparent ornaments between said outer walls and inner core with a portion of said ornaments projecting into said openings during the molding operation.

3. The combination of a circular sectional mold for plastic material and a sectional core, the walls of said mold having an opening for the removal of said core, said walls also having a series of transparent ornament receiving openings, each ornament having a portion extending into its corresponding opening and a shoulder to engage the interior of the wall of the mold about said opening, and means on the exterior of said mold wall for holding each ornament in position.

4. The combination of a mold for plastic material, the walls of said mold having openings to receive ornaments, means associated with each opening for holding said ornaments in position therein consisting of a bridge, and adjustable means associated with said bridge and having a connection with said ornament.

5. The combination of a mold for plastic material having an ornament receiving opening, a bridge on the exterior of said mold extending over said opening, and an adjustable pin associated with said bridge together with means for connecting the end of said pin to the ornament, said ornament having a shoulder to engage the interior of the wall of said mold about said opening.

6. The combination of a mold for plastic material having an ornament-receiving opening, the ornament having a shoulder to engage the interior of the wall of said mold about said opening and having a part which extends through said opening, a bridge on the exterior of the mold extending over said opening, an adjustable pin associated with said bridge, a piece of fabric removably secured to the projecting part of said ornament, and a connection between said pin and fabric.

7. The combination of a mold for plastic material having an ornament-receiving opening, means for holding said ornament in said opening during the casting operation, a core on the interior of said mold, and a removable yieldable cap fitted to the interior of the ornament and arranged to contact the core.

8. The combination of a mold for plastic material having an ornament-receiving opening, means for holding said ornament in said opening, a core on the interior of said mold, and a removable rubber cap fitted to a rounded reduced portion on the inner end of the ornament and arranged to occupy the space between the ornament and the core.

9. The combination with a mold for plastic material having separable walls having an opening therein, an ornament partly extending through said opening having a shoulder to engage the interior of the wall about said opening, a gasket arranged about said shoulder adjacent said wall, and means on the exterior of said wall for holding said ornament in position.

10. The combination of a mold for plastic material having an ornament-receiving opening, a bridge on the exterior of said mold extending over said opening, an adjustable pin associated with said bridge, a removable piece of fabric on said ornament, a plate beneath said fabric, and a hook and eye connection between said plate and fabric.

In testimony whereof, we have hereunto set our hands this 2nd day of May, 1914.

HENRY C. BOURQUIN.
HARRY B. BOURQUIN.

Witnesses:
CHAS. I. WELCH,
E. J. PRINTZ.

Copies of this patent may be obtained for five cents each, by addressing the "Commissioner of Patents, Washington, D. C."